United States Patent
Ikeda et al.

(10) Patent No.: US 9,073,483 B2
(45) Date of Patent: Jul. 7, 2015

(54) VEHICLE SURROUNDINGS MONITORING DEVICE

(75) Inventors: Keigo Ikeda, Kariya (JP); Jun Kadowaki, Kariya (JP); Takashi Kato, Kariya (JP); Yoshihiro Nakamura, Kariya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 391 days.

(21) Appl. No.: 13/519,188

(22) PCT Filed: Dec. 21, 2010

(86) PCT No.: PCT/JP2010/072974
§ 371 (c)(1),
(2), (4) Date: Jun. 26, 2012

(87) PCT Pub. No.: WO2011/104984
PCT Pub. Date: Sep. 1, 2011

(65) Prior Publication Data
US 2012/0300077 A1 Nov. 29, 2012

(30) Foreign Application Priority Data
Feb. 24, 2010 (JP) ................... 2010-039317

(51) Int. Cl.
*H04N 7/18* (2006.01)
*B60R 1/00* (2006.01)

(52) U.S. Cl.
CPC ............. *B60R 1/00* (2013.01); *B60R 2300/607* (2013.01)

(58) Field of Classification Search
CPC ........................... B60R 2300/067; B60R 1/00
USPC ........................................................ 348/148
See application file for complete search history.

(56) References Cited

U.S. PATENT DOCUMENTS 8,466,827 B2 * 6/2013 Nanami ........................ 342/70
8,810,633 B2 * 8/2014 Leung et al. .................. 348/47
(Continued)

FOREIGN PATENT DOCUMENTS

CN 1898961 A 1/2007
CN 101396989 A 4/2009
(Continued)

OTHER PUBLICATIONS

International Preliminary Report on Patentability dated Sep. 27, 2012 issued in PCT/JP2010/072974.
(Continued)

*Primary Examiner* — Jay Patel
*Assistant Examiner* — Frank Huang
(74) *Attorney, Agent, or Firm* — Sughrue Mion, PLLC

(57) ABSTRACT

A vehicle surroundings monitoring device for clarifying the accuracy of detection results and providing notification so that a driver can intuitively ascertain the position in which an object exists, the vehicle surroundings monitoring device comprising: an object detection unit for detecting objects in the periphery of a vehicle; a vehicle image generation unit for generating an image of the vehicle with the point of view set above the vehicle; a periphery image generation unit for generating an image of the periphery of the vehicle including the image of the vehicle; a position-calculating unit for calculating a corresponding position in the image of the periphery on the basis of detection results of the object detection unit; and an indicator unit for indicating the corresponding position in the image of the periphery when the degree of confirmation of the detection results of the object detection unit meets or exceeds an assessment threshold, and for indicating the corresponding region in the image of the periphery when the degree of confirmation of the detection results is less than the assessment threshold.

7 Claims, 6 Drawing Sheets

(56) References Cited

U.S. PATENT DOCUMENTS

| | | | |
|---|---|---|---|
| 8,825,100 B2* | 9/2014 | Chang et al. ................ 455/522 |
| 2004/0066285 A1 | 4/2004 | Sekiguchi | |
| 2004/0098224 A1* | 5/2004 | Takahashi ................... 702/181 |
| 2007/0120656 A1 | 5/2007 | Nakanishi et al. | |
| 2009/0079553 A1 | 3/2009 | Yanagi et al. | |
| 2009/0237269 A1 | 9/2009 | Okugi et al. | |

FOREIGN PATENT DOCUMENTS

| | | |
|---|---|---|
| JP | 2004-37239 A | 2/2004 |
| JP | 2004-117071 A | 4/2004 |
| JP | 2006-21641 A | 1/2006 |
| JP | 2006-292475 A | 10/2006 |
| JP | 2007-22471 A | 2/2007 |
| JP | 2007-49219 A | 2/2007 |
| JP | 2008-58234 A | 3/2008 |
| JP | 2009-40107 A | 2/2009 |
| JP | 2009-104330 A | 5/2009 |
| JP | 2009-117978 A | 5/2009 |
| JP | 2009-226978 A | 10/2009 |

OTHER PUBLICATIONS

International Search Report for PCT/JP2010/072974 dated Mar. 22, 2011.
Chinese Office Action, dated Dec. 3, 2013, issued in corresponding Chinese Patent Application No. 201080055520.2.

* cited by examiner

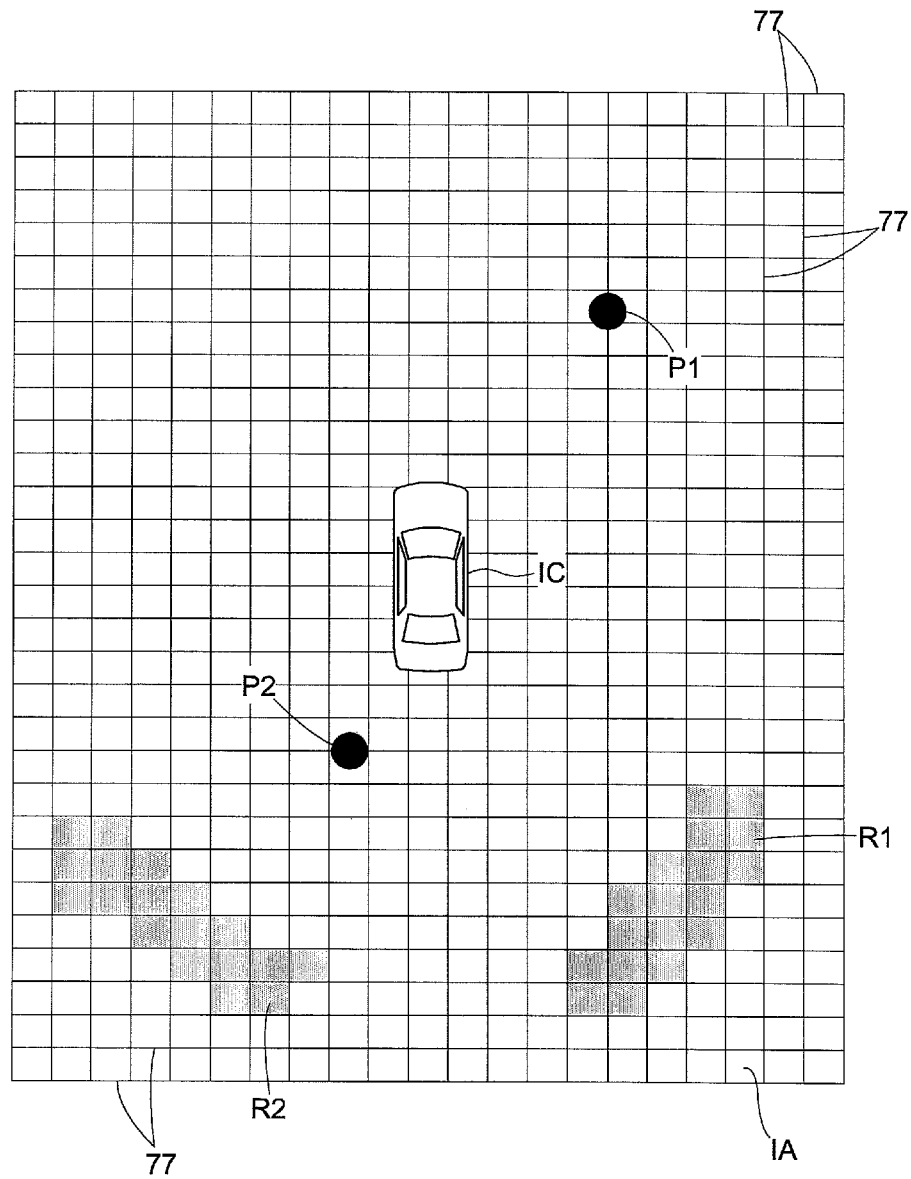

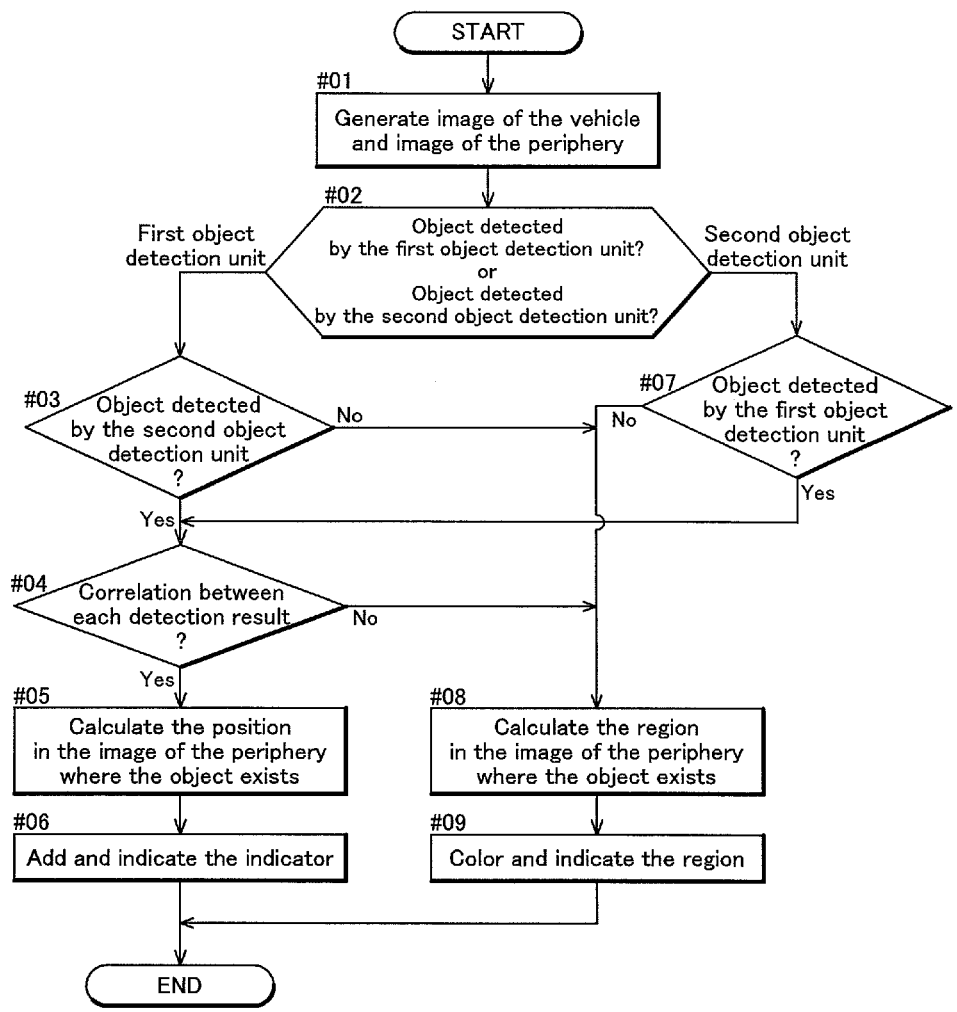

VEHICLE SURROUNDINGS MONITORING DEVICE

CROSS REFERENCE TO RELATED APPLICATIONS

This application is a National Stage of International Application No. PCT/JP2010/072974 filed Dec. 21, 2010, claiming priority based on Japanese Patent Application No. 2010-039317 filed Dec. 24, 2010, the contents of all of which are incorporated herein by reference in their entirety.

TECHNICAL FIELD

The present invention relates to a vehicle surroundings monitoring device for providing notification of objects existing in the periphery of a vehicle.

BACKGROUND ART

Vehicle surroundings monitoring devices for notifying the driver of a vehicle of objects existing in the periphery of his/her vehicle have been conventionally used. As technology of this kind, there are those described in Patent Documents 1 to 3, which are noted as sources below.

The object detection device described in Patent Document 1 comprises radar detection means for detecting objects by radar and imaging detection means for detecting objects by imaging. The recognition precision of objects existing in the surroundings of a vehicle is increased by using these means in combination. On the other hand, the recognition precision of the image detection means is worsened when the object exists far away from the vehicle, and in such a case, judgments are therefore made with judgment standards that are more relaxed than when the distance from the vehicle to the object is near.

The image display control device described in Patent Document 2 detects physical objects existing in the periphery of the vehicle, and performs enhanced display according to the risk level. The risk level is determined according to the speed of the vehicle, the distance to the physical object, and the type of physical object.

The vehicle surroundings observation device described in Patent Document 3 is a technique for monitoring the blind spot region from the viewpoint of the driver. This vehicle surroundings observation device comprises live-image capturing means for capturing a live image of the blind spot region in front of the vehicle. A lattice-shaped grid image which shows the depth perception of the road is superimposed and displayed on the live image so that the driver can intuitively ascertain the depth of the live image. When the driver arrives at a position where the blind spot region can be visually observed, the superimposed display of the lattice-shaped grid image is stopped.

PRIOR ART DOCUMENTS

Patent Documents

[Patent Document 1] Japanese Laid-open Patent Application No. 2006-292475
[Patent Document 2] Japanese Laid-open Patent Application No. 2009-40107
[Patent Document 3] Japanese Laid-open Patent Application No. 2009-226978

DISCLOSURE OF THE INVENTION

Problems that the Invention is Intended to Solve

Patent Document 1 makes no mention concerning a notification method when an object is detected. Furthermore, although relaxing the judgment standards allows the existence of an obstacle to be transmitted to the driver in a simple manner, neither the precision of judging the obstacle nor safety are achieved. In other words, there is a need for the driver to give extreme care for safety regardless of the precision of the judgment. There is therefore a need to be cautious of obstacles having a low precision of judgment (precision of detection), and there is a possibility that driving will be compromised due to mental fatigue.

The object detection device described in Patent Document 2 is lacking in intuitiveness in terms of recognizing danger. There is a need to increase the danger level and perform notification when the distance between the vehicle and the obstacle is close, but such cannot be directly expressed on the screen. In other words, notifications such as "extremely dangerous" or "slightly dangerous" can be performed, but expressions such as "dangerously close" or "far but slightly dangerous" cannot be performed. While it is not impossible to respond by increasing the types of notification modes (e.g., icons), or perform other action, increasing the types will make the system more complicated and lead to reduced intuitiveness. When captured image showing the status of the periphery of the vehicle is acquired using a wide-angle lens, there is a possibility that the captured image will be distorted when the driver views the captured image, and recognition of the distance and direction to the obstacle particularly becomes difficult. For this reason, it is extremely difficult to determine whether or not the danger is extreme because an obstacle in question is nearby in the case that the "extremely dangerous" icon is displayed.

The vehicle surroundings observation device described in Patent Document 3 displays the recognized obstacle with a predetermined marker on a lattice-shaped grid, and displays an arrow or provides other indication when the obstacle moves. However, judgment of danger levels and accompanying switching of displays and other actions are not disclosed. The lattice-shaped grid and the obstacle icon are displayed in the space at the top of the screen, and it is therefore necessary to take time to confirm the icon displayed in the space, and then lower the line of sight to confirm the actual obstacle immediately below. For this reason, the visibility is reduced even if the lattice-shaped grid is superimposed and displayed on the road surface at the bottom of the screen.

In view of the above problems, an object of the present invention is to provide a vehicle surroundings observation device that clarifies and communicates the accuracy of the detection result to the driver and provides notification in a manner that allows the driver to intuitively ascertain the position in which an object exists.

Means for Solving the Problems

The configuration of the vehicle surroundings monitoring device according to the present invention for accomplishing the above-mentioned object is characterized in comprising:
an object detection unit for detecting objects in the periphery of a vehicle, the object detection unit being provided to the vehicle;
a vehicle image generation unit for generating an image of the vehicle with the point of view set above the vehicle;

a periphery image generation unit for generating an image of the periphery of the vehicle from the point of view, the image being partitioned into a plurality of regions in the periphery of the image of the vehicle;

a position-calculating unit for calculating a corresponding position in the image of the periphery on the basis of detection results of the object detection unit;

a degree-of-confirmation assessment unit for assessing whether the degree of confirmation of the detection results detected by the object detection unit meets or exceeds an assessment threshold set in advance; and an indicator unit for indicating the corresponding position in the image of the periphery based on the calculation results of the position-calculating unit when the degree of confirmation of the detection results meets or exceeds the assessment threshold, and for indicating the corresponding region in the image of the periphery on the basis of the calculation results of the position-calculating unit when the degree of confirmation of the detection results is less than the assessment threshold.

The positional relationship between the vehicle and the object can be intuitively ascertained with this characteristic configuration because the driver can confirm the situation of the periphery when the vehicle is viewed from above. The mode for indicating the existence of an object can also be changed according to the detection results detected by the object detection unit. The driver can thus clearly understand the accuracy of the detection by the object detection unit.

It is preferred that the object detection unit be configured from a plurality of object detection units having different detection methods, and that the degree-of-confirmation assessment unit to assess the degree of confirmation as meeting or exceeding the assessment threshold when the detection results of at least two object detection units correlate among the plurality of object detection units.

In accordance with this configuration, the degree of confirmation of the detection results of the object detection unit can be assessed appropriately. The indicator unit can therefore appropriately indicate the existence of an object in accordance with the accuracy of the detection results.

It is also preferred that the at least two object detection units comprise a first object detection unit and a second object detection unit, the first object detection unit detects the direction from the vehicle in which the object exists, and the second object detection unit detects the distance to the object that exists at least within a detection range that is prescribed at a predetermined angle set in advance from the vehicle.

In accordance with this configuration, the position in which the object exists can be accurately determined in accordance with the direction of the object from the vehicle and the distance from the vehicle to the object. The driver can therefore be notified with good accuracy.

The first object detection unit detects the direction and detects by image recognition an object included in the captured image obtained by photographing the situation of the periphery of the vehicle, the second object detection unit detects the distance on the basis of the difference between a transmitted wave that is transmitted within the detection range and a reflected wave in which the transmitted wave hits an object and reflects, the degree-of-confirmation assessment unit can determine that a correlation exists when the direction that is detected by the first object detection unit is included within the detection range of the second object detection unit, which has detected the object that exists at a predetermined distance from the vehicle, and determine the degree of confirmation as meeting or exceeding the assessment threshold.

In accordance with this configuration, the degree of confirmation of the detection results can be suitably assessed because the degree-of-confirmation assessment unit can appropriately judge whether or not there is a correlation between the detection results of the first object detection unit and the detection results of the second object detection unit.

The first object detection unit detects the direction and detects by image recognition an object included in the captured image obtained by photographing the situation of the periphery of the vehicle, and the second object detection unit detects the distance on the basis of the difference between a transmitted wave that is transmitted within the detection range and a reflected wave in which the transmitted wave hits an object and reflects, the degree-of-confirmation assessment unit can calculate by image recognition the distance between the vehicle and the object included in the captured image obtained by the first object detection unit, and can determine the degree of confirmation as meeting or exceeding the assessment threshold using the fact that a correlation exists when the results of the calculation and the distance detected by the second object detection unit substantially match.

In accordance with this configuration, the degree of confirmation of the detection results can be suitably assessed because the degree-of-confirmation assessment unit can appropriately judge whether or not there is a correlation between the detection results of the first object detection unit and the detection results of the second object detection unit.

It is preferred for the indicator unit to display an indicator in a corresponding position corresponding in the image of the periphery when the degree of confirmation meets or exceeds the assessment threshold set in advance.

In accordance with this configuration, the existence of an object and the fact that the accuracy of the detection results of the object detection unit is high can be communicated appropriately to the driver.

It is also preferred that the indicator unit color the corresponding region in the image of the periphery when the degree of confirmation is less than the assessment threshold set in advance.

In accordance with this configuration, the existence of an object and the fact that the accuracy of the detection results of the object detection unit is low can be communicated appropriately to the driver.

BRIEF DESCRIPTION OF THE DRAWINGS

FIG. 5 is an illustration showing an example of the case in which an object existing in the periphery of the vehicle is indicated on the image of the periphery; and FIG. 6 is a flowchart of the process performed by the vehicle surroundings monitoring device.

BEST MODE FOR CARRYING OUT THE INVENTION

Figure 1:
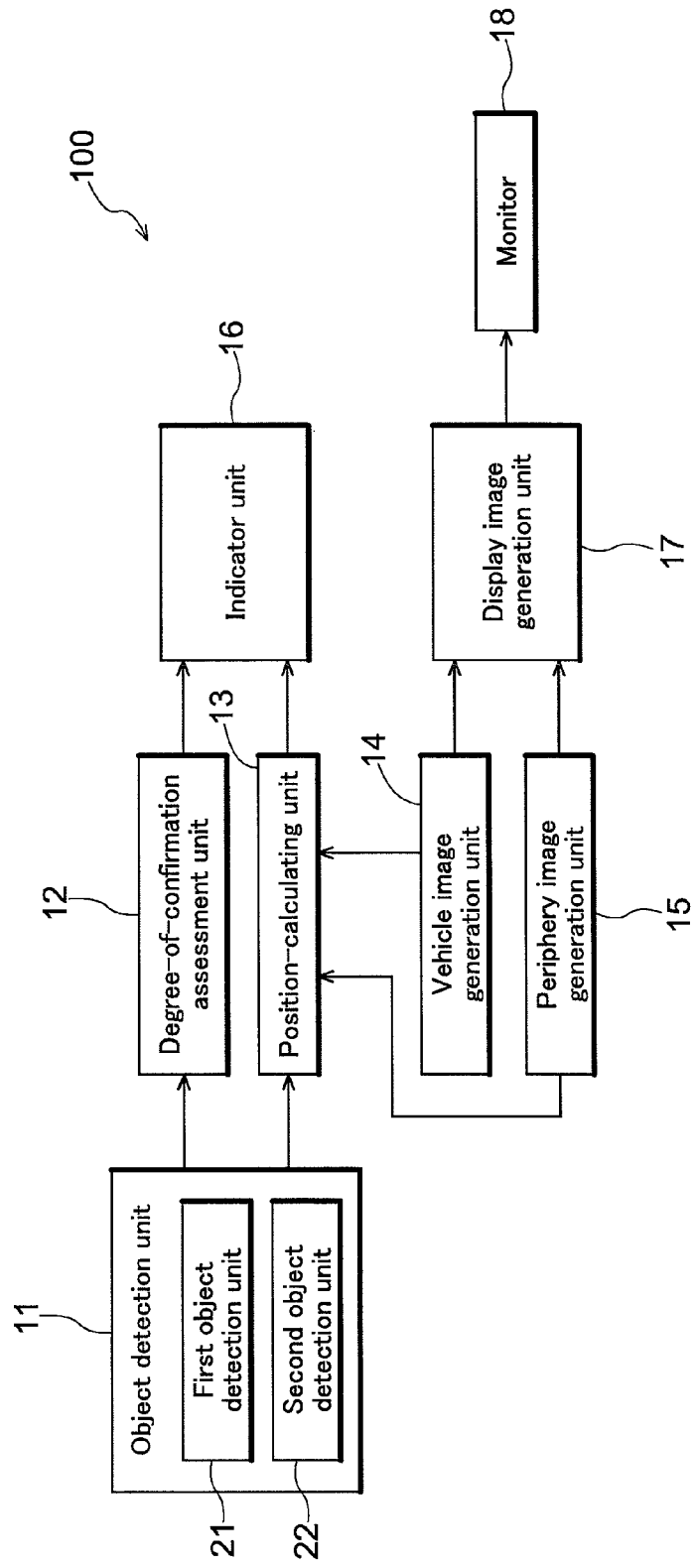
FIG. 1 is a block diagram schematically showing a general configuration of the vehicle surroundings monitoring device.

An embodiment of the present invention will be described below in detail. The vehicle surroundings monitoring device 100 according to the present invention is provided with a function for monitoring the surroundings of a vehicle 50 (see FIG. 2). More specifically, the present vehicle surroundings monitoring device 100 has a function for detecting an object existing in the surroundings of the vehicle 50 and providing notification so the driver of the vehicle 50 can intuitively ascertain the existence of the object. FIG. 1 is a block diagram schematically showing a general configuration of the vehicle surroundings monitoring device 100 according to the present invention. The vehicle surroundings monitoring device 100 is configured comprising an object detection unit 11, a degree-of-confirmation assessment unit 12, a position-calculating unit 13, a vehicle image generation unit 14, a periphery image generation unit 15, an indicator unit 16, a display image generation unit 17, and a monitor 18. The vehicle surroundings monitoring device 100 configured in this manner is constructed using the above functional units for performing a variety of processing to monitor the vehicle 50. Using a CPU as the core member, the functional units may be embodied in hardware, software, or both.

The object detection unit 11 is provided to the vehicle 50 and detects objects in the periphery of the vehicle 50. In the present embodiment, the periphery of the vehicle 50 corresponds to the front, rear, left side, and right side of the vehicle 50. It is also possible to use a configuration for detecting an object existing in at least one of the front, rear, left side, and right side of the vehicle 50. The object is not limited to moving objects, but includes objects in a stationary state. Such objects are detected by the object detection unit 11, whereby the vehicle surroundings monitoring device 100 can recognize obstacles.

The object detection unit 11 is configured from a plurality of object detection units having different detection methods. A detection method is a method by which the object detection unit 11 performs detection. Thus, having different detection methods indicates that the types of methods of detection are different. In the present embodiment, the direction in which the object exists from the vehicle 50 and the distance from the vehicle 50 to the object are detected by these different detection methods. The object detection unit 11 is configured from a plurality of object detection units in which such detection methods differ. In the present embodiment, the plurality of object detection units is described as being a first object detection unit 21 and a second object detection unit 22 to simplify understanding.

Figure 2:
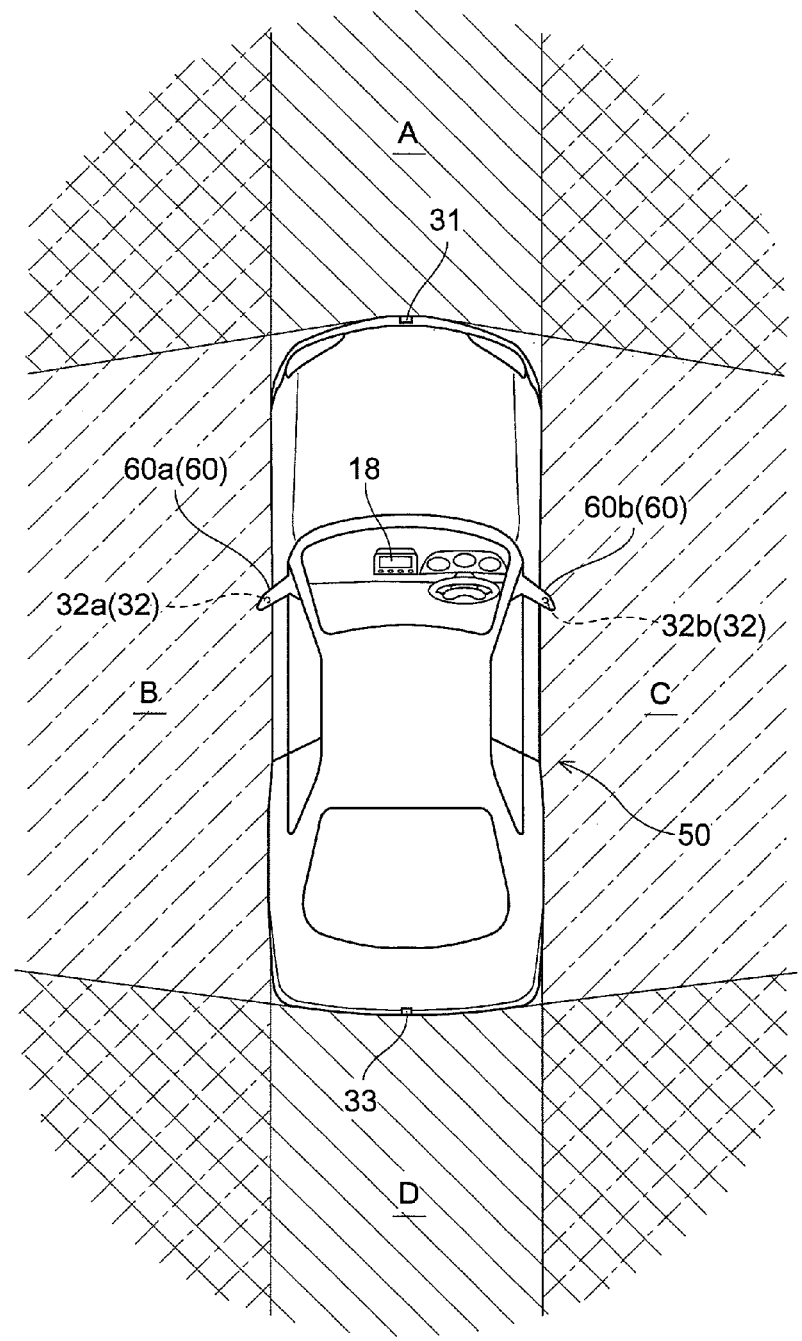
FIG. 2 is a diagram showing the cameras provided to the vehicle and the capturing ranges of the cameras.

The first object detection unit 21 detects the direction and distance at which the object exists from the vehicle 50. In the present embodiment, a camera installed in the vehicle 50 is used as the first object detection unit 21. Cameras installed in the vehicle 50 are shown in FIG. 2. The vehicle 50 is provided with a front camera 31, side cameras 32, and a rear camera 33. The front camera 31 obtains captured images in which the scene to the front of the vehicle 50 has been captured. The front camera 31 is configured from, for example, a CCD camera, or the like. Such a front camera 31 is provided to the front portion of the vehicle 50 (e.g., front grill, or the like), as shown in FIG. 2. It is preferred that the front camera 31 be configured using, for example, a fisheye lens, and in this case, a captured image including at least the scene of the region shown as A in FIG. 2 is obtained.

The side cameras 32 are provided to side mirrors 60 of the vehicle 50. The side cameras 32 are configured from a pair of side cameras 32a, 32b (left side camera 32a and right side camera 32b) for obtaining captured images by capturing the scene to the left side and the scene to the right side of the vehicle 50, including vertically below the side mirrors 60. In the present embodiment, the camera provided to the side mirror 60a on the left side relative to the direction of travel of the vehicle 50 is described as the left side camera 32a and the camera provided to the side mirror 60b on the right side relative to the direction of travel of the vehicle 50 is described as the right side camera 32b, as shown in FIG. 2. The cameras are described as side camera 32 in the particular case that there is no need to specify either the left side camera 32a or the right side camera 32b.

The left side camera 32a captures the scene to the left side of the vehicle 50, including vertically below the side mirror 60a on the left side and obtains the captured image. It is preferred that the side camera 32 be configured using a fisheye lens in the same manner as the front camera 31 described above. In this case, a captured image from capturing the scene of at least the region shown as B in FIG. 2 is obtained by the left side camera 32a. The right side camera 32b captures the scene to the right side of the vehicle 50, including vertically below the side mirror 60b on the right side and obtains the captured image. A captured image from capturing the scene of at least the region shown as C in FIG. 2 is obtained by the right side camera 32b.

The rear camera 33 obtains the captured image from capturing the scene to the rear of the vehicle 50. The rear camera 33 is provided to the rear portion (e.g., rear bumper, molding provided to the rear portion, or the like) of the vehicle 50, as shown in FIG. 2. It is preferred that the rear camera 33 also be configured using, for example, a fisheye lens, and a captured image from capturing the scene of at least the region shown as D in FIG. 2 is obtained in this case. The regions captured with each camera can be configured so as to overlap at the border portions of each other. Although not shown in the drawings, the regions A to D described above can also be configured so as to have regions that do not overlap with one another.

The captured images obtained by each of these cameras are used to determine the direction in which the object exists as viewed from the vehicle by the disposed location, disposed angle, and the like of each camera. The captured images obtained by each camera are transmitted to the degree-of-confirmation assessment unit 12 and the position-calculating unit 13 described below.

Figure 3:
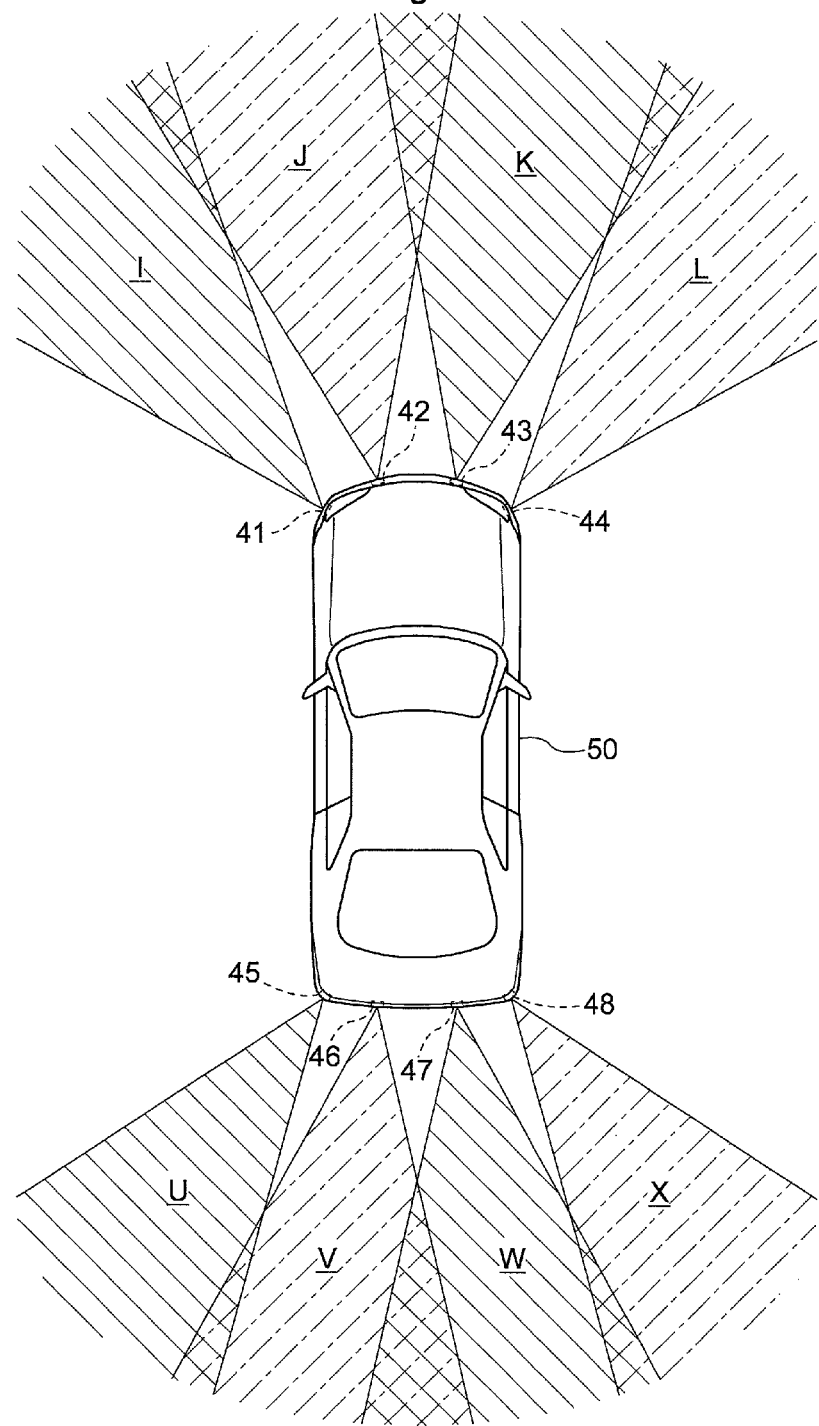
FIG. 3 is a diagram showing the sonar provided to the vehicle and the detection ranges of the sonar.

The second object detection unit 22 detects at least the distance from the vehicle 50 to the object that exists within the detection range, which is defined by a predetermined angle set in advance. In the present embodiment, sonars (e.g., infrared sensor) installed in the vehicle 50 are used as the second object detection unit 22. FIG. 3 shows the sonars installed in the vehicle 50. Four sonars (sonars 41 to 44) are provided to the front part of the vehicle 50 and four sonars (sonars 45 to 48) are provided to the rear part. Each sonar is set so as to perform detection of a range defined by a predetermined angle in the vertical direction and horizontal direction about the center of each provided location. FIG. 3 shows a planar diagram, and the range in the vertical direction is omitted from the drawing.

The sonars 41 to 44 have the regions indicated as I to L, respectively, in FIG. 3 set as the detection regions. The sonars 45 to 48 have the regions indicated as U to X, respectively, in FIG. 3 set as the detection regions. The sonars 41 to 48 transmit ultrasonic waves as a transmitted signal into the respective detection regions, and receive the reflected waves that hit the object and are reflected. The distance from the vehicle 50 to the object is detected on the basis of the time difference of the transmitted signal and the reflected wave. In the detection results of the sonars 41 to 44, however, the distance from the vehicle 50 to the object can be detected, but the direction can only be judged as being within the detection region (e.g., region I). The process for such detection is not described because it is known in the art. The detection results detected by each sonar are transmitted to the degree-of-confirmation assessment unit 12 and the position-calculating unit 13 described below.

Figure 4:
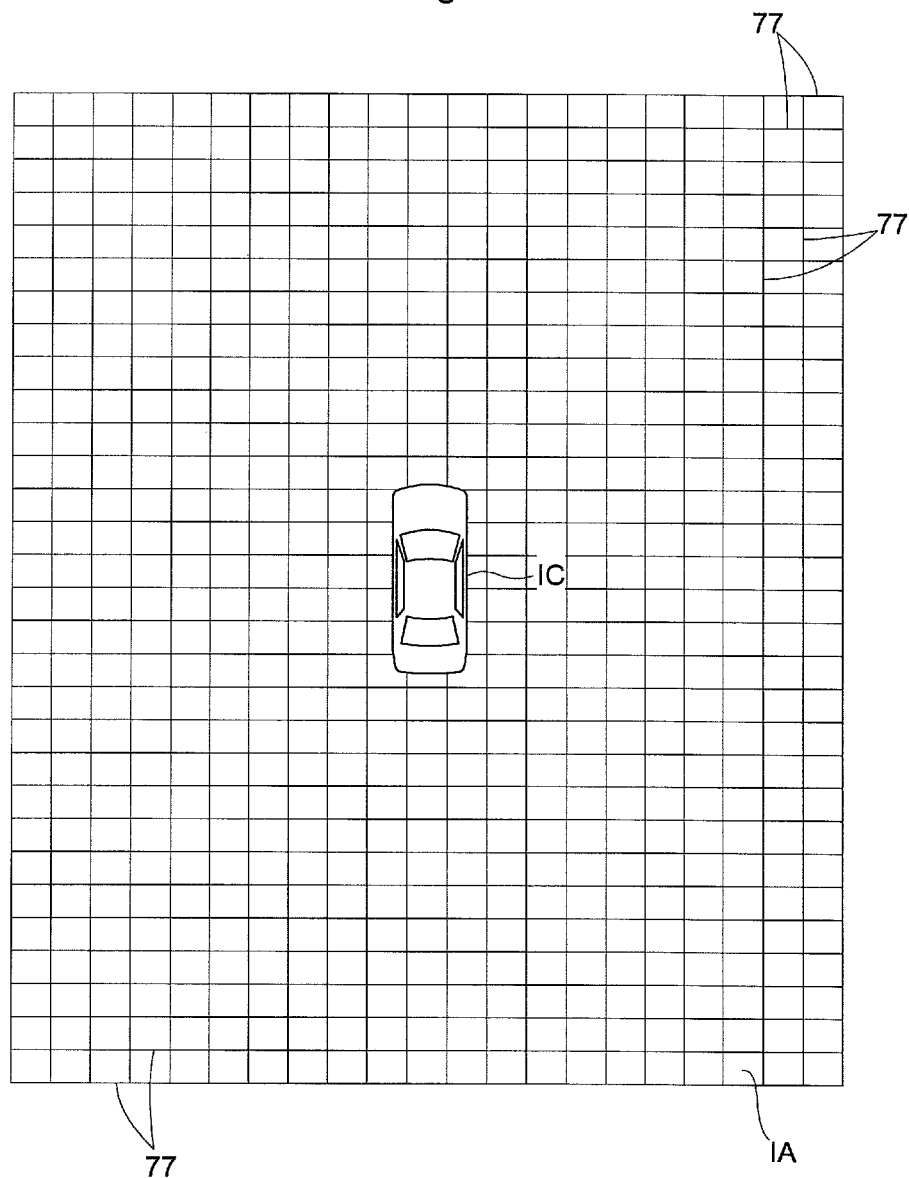
FIG. 4 is an illustration showing the image of the vehicle and the image of the periphery.

The vehicle image generation unit 14 generates an image IC of the vehicle 50 with the point of view set above the vehicle 50. The point of view set above the vehicle 50 is a point of view looking down at the vehicle 50. It is therefore possible for the point of view to be set so as to look down at the rear of the vehicle 50 from the diagonal front of the vehicle 50, and for the point of view to be set so as to look down at the front of the vehicle 50 from the diagonal rear of the vehicle 50. It is also possible for the point of view to be set so as to look down at the vehicle 50 from vertically above the vehicle 50. Such an image IC of the vehicle 50 is shown in FIG. 4. An example where the point of view is set to be vertically above the vehicle 50 is shown in the present embodiment, as shown in FIG. 4. The image IC of the vehicle 50 corresponds to an image that schematically shows the vehicle 50 when the vehicle 50 is viewed from vertically above. This image IC can be an image of the vehicle that is actually captured with a camera or the like and can also be an illustration. The image IC that is generated by the image generation unit 14 is transmitted to the position-calculating unit 13 and the display image generation unit 17 described below.

The periphery image generation unit 15 generates an image IA of the periphery of the vehicle 50 from the point of view described above, in which the periphery of the image IC of the vehicle 50 is divided into a plurality of regions. The image IA of the periphery of the vehicle 50 is an image schematically showing the situation of the periphery of the vehicle 50. This image IA of the periphery is generated with the same point of view as the point of view as that of the image IC of the vehicle 50 that is generated by the above-described vehicle image generation unit 14. Separator lines 77 are drawn so as to be superimposed on such an image IA of the periphery. The image IA of the periphery is thereby separated into a plurality of regions.

An example with such separator lines 77 drawn in the vertical direction and the horizontal direction (lattice-shaped separators) is shown in FIG. 4. Such separator lines 77 are simply one example, and it is naturally possible to draw using other forms. The periphery image generation unit 15 draws separator lines 77 on the image IA of the periphery. The image IA of the periphery that has separator lines 77 drawn thereon and that is generated by the periphery image generation unit 15 is transmitted to the position-calculating unit 13 and the display image generation unit 17 described below.

The position-calculating unit 13 calculates the corresponding position in the image IA of the periphery on the basis of the detection results of the object detection unit 11. The object detection unit 11 is the first object detection unit 21 and the second object detection unit 22 and corresponds to the cameras and sonars respectively. Here, the cameras detect the direction of the object from the vehicle 50 and the sonar detects the distance from the vehicle 50 to the object as described above. The image IA of the periphery shown in FIG. 4 is an image schematically showing the periphery of the vehicle 50 with the point of view set above the vehicle 50. For this reason, the detection results of the cameras and the sonars cannot be merely displayed onto the image IA of the periphery. The position-calculating unit 13 therefore calculates the position on the image IA of the periphery, i.e., the coordinate in the case that the image IA of the periphery is set to be a 2-dimensional plane, on the basis of the detection results of the cameras and the sonars. The calculation results that have been calculated by the position-calculating unit 13 are transmitted to the indicator unit 16 described below.

The degree-of-confirmation assessment unit 12 assesses whether or not the degree of confirmation of the detection results that are detected by the object detection unit 11 meets or exceeds an assessment threshold set in advance. The detection results that are detected by the object detection unit 11 are the results showing the direction of the object as viewed from the vehicle 50 and that is detected by the cameras, which are the first object detection unit 21, and the results showing the distance from the vehicle 50 to the object detected by the sonars, which are the second object detection unit 22. The degree of confirmation corresponds to the degree of accuracy (quality of being exact). The degree-of-confirmation assessment unit 12 therefore assesses whether or not the degree of accuracy of the detection results meets or exceeds the assessment threshold set in advance.

Here, the degree-of-confirmation assessment unit 12 assesses the degree of confirmation as meeting or exceeding the assessment threshold when a correlation exists in the detection results of the two object detection units 11. In the present embodiment, the two object detection units 11 are the first object detection unit 21 and the second object detection unit 22. A correlation existing in these detection results means that a correlation exists between the results showing the direction of the object as viewed from the vehicle 50 and that is detected by the cameras, which are the first object detection unit 21, and the results showing the distance from the vehicle to the object and that is detected by the sonars, which are the second object detection unit 22.

In other words, it is possible for the degree-of-confirmation assessment unit 12 to assess whether the degree of confirmation meets or exceeds the assessment threshold having established that a correlation exists in the case that the direction of the object that is detected by the first object detection unit 21 is included within the detection range of the second object detection unit 22 which has detected the object that exists at a predetermined distance from the vehicle 50, in the case of a configuration in which the cameras as the first object detection unit 21 detect by image recognition the object that is included in the captured image obtained by capturing the situation of the periphery of the vehicle 50 to detect the direction in which the objects exist, and the sonars as the second object detection unit 22 detect the distance from the vehicle 50 to the object on the basis of the difference between the transmitted wave that is transmitted within the detection range prescribed at a predetermined angle set in advance and the reflected wave in which the transmitted wave hits the object and reflects.

It is also possible for the degree-of-confirmation assessment unit 12 to assess whether the degree of confirmation meets or exceeds the assessment threshold and whether a correlation exists when the distance between the object, which is included in the captured image obtained by the first object detection unit 21, and the vehicle 50 is calculated by image recognition, and the results of the calculation and the distance that is detected by the second object detection unit 22 substantially match.

Here, an object positioned far away is displayed small in the captured image obtained by the cameras that are used as the first object detection unit 21. The accuracy of the detection results by the first object detection unit 21 therefore worsens as the distance from the vehicle 50 increases. For this reason, the degree-of-confirmation assessment unit 12 assesses the degree of confirmation to be less than the assessment threshold when it is difficult to identify the object that is included in the captured image obtained by the first object detection unit 21. Such assessment results are transmitted to the indicator unit 16 described below.

The indicator unit 16 indicates the corresponding position in the image IA of the periphery on the basis of the calculation results of the position-calculating unit 13 when the degree of confirmation of the detection results meets or exceeds the assessment threshold, and indicates the corresponding region in the image IA of the periphery on the basis of the calculation results of the position-calculating unit 13 when the degree of confirmation of the detection results is less than the assessment threshold. Whether or not the degree of confirmation of the detection results meets or exceeds the assessment threshold is assessed by the degree-of-confirmation assessment unit 12 described above. The corresponding position in the image IA of the periphery based on the detection results of the first object detection unit 21 and the second object detection unit 22 is calculated and transmitted by the position-calculating unit 13.

As described above, the indicator unit 16 indicates the corresponding position when the degree of confirmation of the detection results meets or exceeds the assessment threshold because the accuracy of the direction and distance of the object as viewed from the vehicle 50 is high. Specifically, the indicator unit 16 displays an indicator at the corresponding position in the image IA of the periphery when the degree of confirmation meets or exceeds the assessment threshold set in advance. Such indicators are shown in FIG. 5 as reference numerals P1 and P2. In this manner, when the degree of confirmation meets or exceeds the assessment threshold set in advance, the indicator showing the existence of the object is displayed regardless of the separator lines 77 and the regions separated by the separator lines 77. In other words, the indicator showing the existence of the object is displayed at the corresponding position when the degree of confirmation meets or exceeds the assessment threshold set in advance regardless of the separator lines 77 and the regions separated by the separator lines 77.

On the other hand, the indicator unit 16 indicates the corresponding region when the degree of confirmation of the detection results is less than the assessment threshold because the degree of accuracy of the direction and distance of the object as viewed from the vehicle 50 is low. Specifically, the indicator unit 16 colors the corresponding region in the image IA of the periphery when the degree of confirmation is less than the assessment threshold set in advance. The regions colored in this manner are shown in FIG. 5 as reference numerals R1 and R2. The regions showing the existence of an object are displayed according to the regions separated by separator lines 77 in this manner when the degree of confirmation is less than the assessment threshold set in advance. Such indications are further performed in the image IA of the periphery that is in the display image generation unit 17 and that was transmitted from the periphery image generation unit 15.

The display image generation unit 17 generates the display image to be displayed by the monitor 18. The display image is the image IC of the vehicle 50 that is generated by the vehicle image generation unit 14 and the image IA of the periphery that is generated by the periphery image generation unit 15. Also included are the indicator and the coloring of regions that are superimposed and indicated on the image IA of the periphery. Such display images are transmitted to the monitor 18 and displayed. Such displays are performed in real time, and are displayed on the monitor 18 as the vehicle 50 moves or as the object moves. Thus, the object existing in the periphery of the vehicle 50 is displayed on the monitor 18 and notification is provided, whereby the driver can intuitively ascertain the situation of the periphery of the vehicle 50 and be aware of the accuracy of thereof.

Described next is the process relating to the notification when the present vehicle surroundings monitoring device 100 detects an object. FIG. 6 is a flowchart of the process performed by the vehicle surroundings monitoring device 100. Furthermore, this flow chart shows one example of the process and the order of the process is not limited thereto. In other words, it is naturally possible to vary the order of the process as appropriate.

First, the vehicle image generation unit 14 generates the image IC of the vehicle 50 with the point of view set above the vehicle 50, and the periphery image generation unit 15 generates the image IA of the periphery of the vehicle 50 from the same point of view as the image IC of the vehicle 50 (Step #01).

When the object is detected by the first object detection unit 21 (Step #02: first object detection unit) and the object is also detected by the second object detection unit 22 (Step #03: Yes), the degree-of-confirmation assessment unit 12 assesses the degree of confirmation of these detection results. If the degree-of-confirmation assessment unit 12 determines that the degree of confirmation meets or exceeds the assessment threshold set in advance, i.e., if there is a correlation between the detection results of the first object detection unit 21 and the second object detection unit 22 (Step #04: Yes), the position-calculating unit 13 calculates the position in the image IA of the periphery where the object exists on the basis of these detection results (Step #05).

The indicator unit 16 indicates the position calculated in this manner in the image IA of the periphery with an indicator attached (Step #06). It is thereby possible to provide notification to the driver of the vehicle 50 of the existence of the object and to inform that the accuracy of the detection of the object is high.

Returning to Step #02, when the object is detected by the second object detection unit 22 (Step #02: second object detection unit) and the object is also detected by the first object detection unit 21 (Step #07: Yes), the degree-of-confirmation assessment unit 12 assesses the degree of confirmation of these detection results. If the degree-of-confirmation assessment unit 12 determines that degree of confirmation meets or exceeds the assessment threshold set in advance i.e., if there is a correlation between the detection results of the first object detection unit 21 and the second object detection unit 22 (Step #4: Yes), the position-calculating unit 13 calculates the position in the image IA of the periphery where the object exists on the basis of these detection results (Step #5).

The indicator unit 16 indicates the position calculated in this manner in the image IA of the periphery with an indicator attached (Step #06). It is thereby possible to provide notification to the driver of the vehicle 50 of the existence of the object and to inform that the accuracy of the detection of the object is high.

When the object is detected by the first object detection unit 21 (Step #02: first object detection unit) yet the object is not detected by the second object detection unit 22 (Step #03: No) in Step #02; when the object is detected by the second object detection unit 22 (Step #02: second object detection unit) yet the object is not detected by the first object detection unit 21 (Step #07: No) in Step #02; or when there is no correlation between the detection results of the first object detection unit 21 and the detection results of the second object detection unit 22 (Step #04: No) in Step #04, the position-calculating unit 13 calculates the region of the image IA of the periphery in which the object exists on the basis of each of the detection results (Step #08).

The indicator unit 16 colors and indicates the region calculated in this manner in the image IA of the periphery (Step

09). It is thereby possible to provide notification to the driver of the vehicle 50 of the existence of the object and to inform that the accuracy of the detection of the object is low. Furthermore, when the object is not detected by both the first object detection unit 21 and the second object detection unit 21 in Step #02, the processing can be put on hold until the object is detected by at least one of the object detection units or the processing can be performed so as to provide notification that the object does not exist in the periphery of the vehicle 50. The present vehicle surroundings monitoring device 100 follows a such a flow chart and provides notification of the situation of the periphery to the driver of the vehicle 50.

Other Embodiments

In the embodiment described above, the object detection unit 11 is described as comprising the two object detection units, i.e., the first object detection unit 21 and the second object detection unit 22. However, the scope of application of the present invention is not limited thereby. The object detection unit 11 may be configured from three or more, and may be one that can detect various objects to be detected using a single object detection unit 11. The direction of the object from the vehicle 50 and the distance from the vehicle 50 to the object can be appropriately detected even with such object detection units 11.

In the embodiment described above, the second object detection unit 22 was described as being provided with four each to the front part and the rear part of the vehicle 50. However, the scope of application of the present invention is not limited thereby. The second object detection unit 22 may be configured with three or less each to the front part and rear part, and may also be configured with five or more. It is also apparent that it is possible to use a configuration in which different numbers are provided each to the front part and rear part. It is also naturally possible to use a configuration in which the second object detection unit 22 is provided only on the front part or only on the rear part.

In the embodiment described above, the indication by the indicator unit 16 is described as coloring the corresponding region. However, the scope of application of the present invention is not limited thereby. The indication by the indicator unit 16 can be made to stereoscopically display the corresponding region. The coloring of the regions by the indicator unit 16 may also color the entire area of the corresponding region and may color the separator lines 77 of the outer boundary portion of that region. The coloring can also be a translucent display. It is naturally possible to appropriately notify the driver of the vehicle 50 of the object that exists in the periphery of the vehicle 50 even with such indications.

In the embodiment described above, it was described that the indicator unit 16 displays an indicator at a corresponding position. However, the scope of application of the present invention is not limited thereby. For example, the display of the indicator by the indicator unit 16 may perform movement prediction and add an arrow when the object is a moving object. It is possible by performing such indication for the driver of the vehicle 50 to recognize that the object is a moving object and to also exercise caution to the direction of movement of the object.

INDUSTRIAL APPLICABILITY

The present invention can be used in a vehicle surroundings monitoring device for performing notification of an object existing in the periphery of a vehicle.

KEY

11 Object detection unit
12 Degree-of-confirmation assessment unit
13 Position-calculating unit
14 Vehicle image generation unit
15 Periphery image generation unit
16 Indicator unit
17 Display image generation unit
18 Monitor
21 First object detection unit
22 Second object detection unit

The invention claimed is:

1. A vehicle surroundings monitoring device comprising:
an object detection unit for detecting objects in the periphery of a vehicle, the object detection unit being provided to the vehicle;
a vehicle image generation unit for generating an image of the vehicle with the point of view set above the vehicle;
a periphery image generation unit for generating an image of the periphery of the vehicle from the point of view, the image being partitioned into a plurality of regions in the periphery of the image of the vehicle;
a position-calculating unit for calculating a corresponding position in the image of the periphery on the basis of detection results of the object detection unit;
a degree-of-confirmation assessment unit for assessing whether a degree of confirmation of the detection results detected by the object detection unit meets or exceeds an assessment threshold set in advance; and
an indicator unit for indicating a position indicating existence of the object in the image of the periphery based on the calculation results of the position-calculating unit when the degree of confirmation of the detection results meets or exceeds the assessment threshold, and for indicating a region of the plurality of partitioned regions which region indicates the existence of the object in the image of the periphery on the basis of the calculation results of the position-calculating unit when the degree of confirmation of the detection results is less than the assessment threshold.

2. The vehicle surroundings monitoring device according to claim 1, wherein the object detection unit is configured from a plurality of object detection units having different detection methods; and
the degree-of-confirmation assessment unit assesses the degree of confirmation as meeting or exceeding the assessment threshold when the detection results of at least two object detection units correlate among the plurality of object detection units.

3. The vehicle surroundings monitoring device according to claim 2, wherein the at least two object detection units comprise a first object detection unit and a second object detection unit, the first object detection unit detects the direction from the vehicle in which the object exists, and the second object detection unit detects the distance to the object that exists at least within a detection range that is prescribed at a predetermined angle set in advance from the vehicle.

4. The vehicle surroundings monitoring device according to claim 3, wherein the first object detection unit detects the direction and detects by image recognition an object included in the captured image obtained by photographing the situation of the periphery of the vehicle;
the second object detection unit detects the distance on the basis of the difference between a transmitted wave that is transmitted within the detection range and a reflected wave in which the transmitted wave hits an object and reflects; and the degree-of-confirmation assessment unit determines that a correlation exists when the direction that is detected by the first object detection unit is included within the detection range of the second object detection unit, which has detected the object that exists at a predetermined distance from the vehicle, and determines the degree of confirmation as meeting or exceeding the assessment threshold.

5. The vehicle surroundings monitoring device according to claim 3, wherein the first object detection unit detects the direction and detects by image recognition an object included in the captured image obtained by photographing the situation of the periphery of the vehicle;

the second object detection unit detects the distance on the basis of the difference between a transmitted wave that is transmitted within the detection range and a reflected wave in which the transmitted wave hits an object and reflects; and the degree-of-confirmation assessment unit calculates by image recognition the distance between the vehicle and the object included in the captured image obtained by the first object detection unit, and assesses the degree of confirmation as meeting or exceeding the assessment threshold using the fact that a correlation exists when the results of the calculation and the distance detected by the second object detection unit substantially match.

6. The vehicle surroundings monitoring device according to claim 1, wherein the indicator unit displays an indicator in a corresponding position in the image of the periphery when the degree of confirmation meets or exceeds the assessment threshold set in advance.

7. The vehicle surroundings monitoring device according to claim 1, wherein the indicator unit colors the region indicating the existence of the object in the image of the periphery when the degree of confirmation is less than the assessment threshold set in advance.

* * * * *